June 24, 1930.  C. W. SMITH  1,768,219
EXTENSION BIT HOLDER
Filed April 9, 1928   2 Sheets-Sheet 1
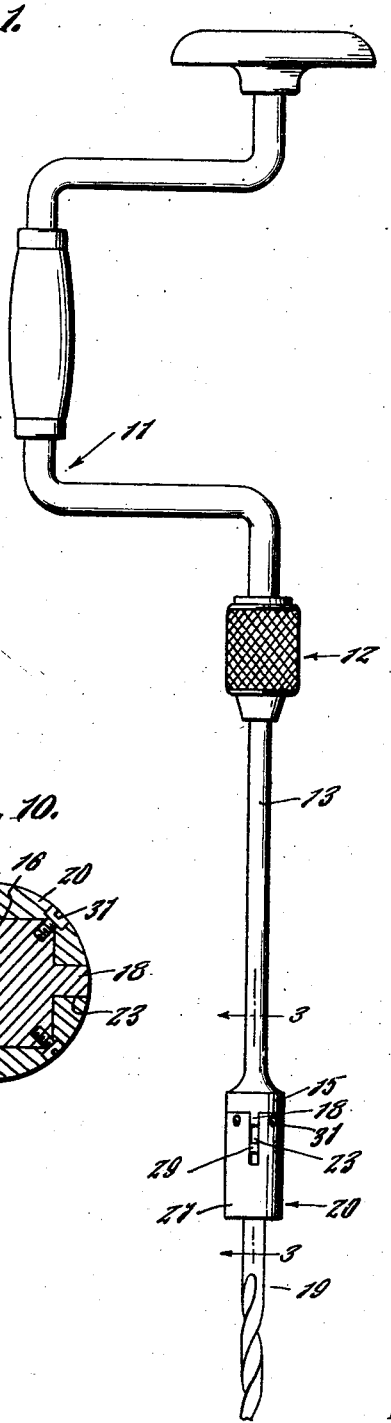
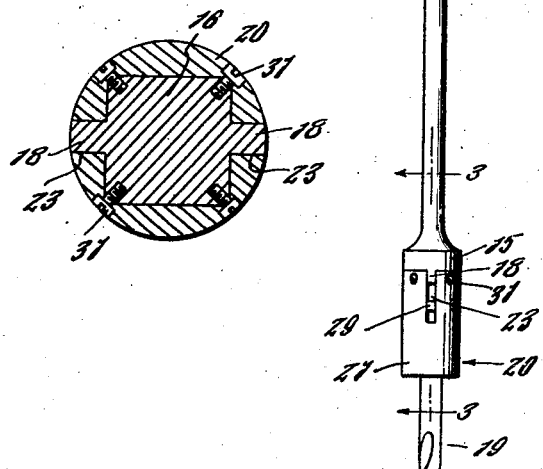
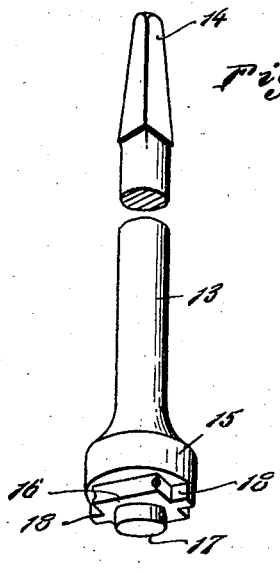
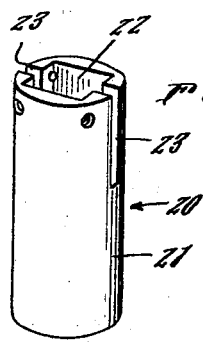
Inventor
Charles W. Smith
By Clarence A. O'Brien
Attorney June 24, 1930.  C. W. SMITH  1,768,219
EXTENSION BIT HOLDER
Filed April 9, 1928   2 Sheets-Sheet 2

Inventor
Charles W. Smith
By Clarence A. O'Brien
Attorney

Patented June 24, 1930

1,768,219

UNITED STATES PATENT OFFICE

CHARLES W. SMITH, OF GREEN ISLAND, NEW YORK

EXTENSION-BIT HOLDER

Application filed April 9, 1928. Serial No. 268,599.

The present invention relates to an improved brace and bit structure and has more particular reference to a novel coupling and retaining device for an extension bit, and my improvement aims to provide a device which is characterized by the novel arrangement of details, cooperating to provide a dependable type of coupling and holder, for an extension bit, the arrangement being characteristic in that it is simple, and well equipped to fulfill the requirements of a structure of this class.

Briefly described, the invention comprises an extension shank which is releasably connected with an ordinary brace and which carries a reliable and practical coupling for an extension bit, the coupling including an automatically engageable and manually releasable spring pressed retaining device for coaction with the head on the extension bit. The particular association of parts serving to provide this improvement will become more readily apparent from the following description and drawings.

In the drawings:

Figure 1 is an elevational view of the brace, the extension shank, the extension bit, and the quick releasable coupling between the bit and the shank.

Figure 2 is a perspective view of the shank per se.

(In Figure 3, the retainer has been released.)

Figure 8 is a perspective view of the slidable retainer.

Figure 9 is a perspective view of the body portion of the improved extension bit coupling.

Figure 10 is a section on the line 10—10 of Figure 3.

Figure 3:
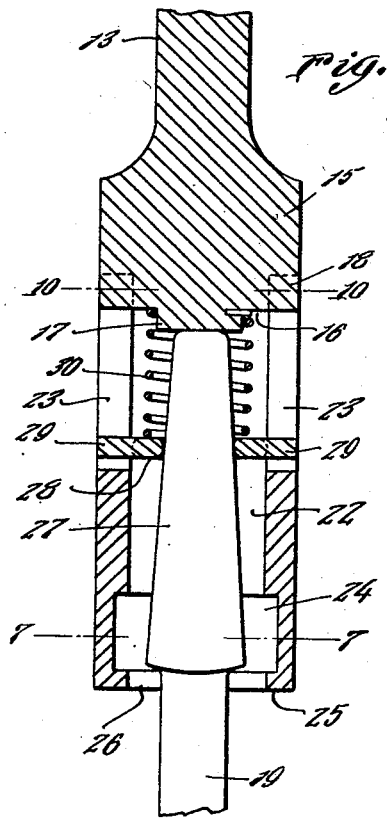
Figure 3 is a fragmentary enlarged sectional and elevational view, taken approximately upon the line 3—3 of Figure 1.

Attention is now invited to Figure 1, wherein it will be observed that the reference character 11 designates an ordinary brace provided with customary chuck 12, for separable connection with the improved extension shank 13. This shank, as shown in Figure 2, is provided with a usual tapered head 14, to cooperate with the chuck 12 and on its bottom it is improved by the presence of an enlarged circular head 15.

The head 15 is provided on its bottom with a centralized block like extension 16 having a central spring anchor and bit abutment 17 and provided on opposite sides with outstanding retaining lugs 18.

Figure 4:
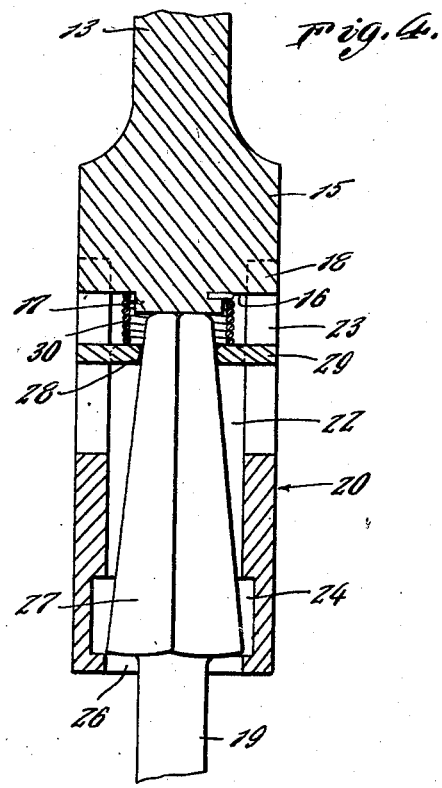
Figure 4 is a view like Figure 3, showing the head of the bit at the time of insertion and just before it is turned to release the spring pressed retainer.
Figure 6:
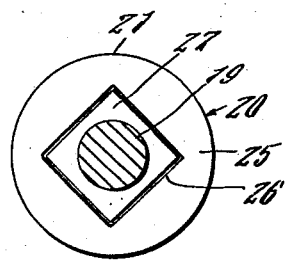
Figure 6 is a bottom plan view of Figure 4.
Figure 7:
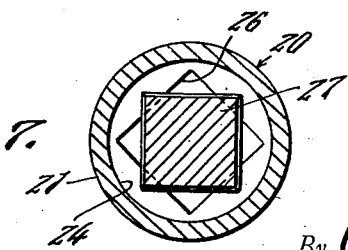
Figure 7 is a cross sectional view taken approximately on the plane of the line 7—7 of Figure 3.

The improved coupling for the extension bit 19 is generally designated by the reference character 20 and as shown in Figure 9, it is in the form of an external cylindrical body 21, open at its opposite ends. The upper portion of the body is formed with a socket 22 of polygonal cross section and with diametrically opposite guide slots 23. As shown in Figures 3 and 4, there is a cylindrical chamber 24, at the bottom, and an inturned flange 25, having a square entrance opening 26, for passage of the elongated tapered head 27 of the extension bit. The extension bit is placed as shown in Figures 4 and 6 and inserted through the entrance opening until the head bears against the abutment 17.

The retainer 28, see Figure 8, is in the form of a substantially square slide, the same being provided with opposite outstanding tongues 29, slidable in the slot 23.

These tongues operate additionally as finger pieces for releasing the retainer. Cooperating with this retainer is the coil spring 30, the upper end of which embraces and is anchored to the abutment 17, the lower end of which surrounds the head 27 and bears upon the slidable retainer 28, as shown in Figures 3 and 4.

Incidentally, the wall of the polygonal socket 23, in which the retainer is slidable is smooth and the retainer is preferably of the configuration shown in Figure 8, so that friction is eliminated, as much as possible. In practice, it is desirable to oil the walls of this chamber to prevent possible binding of the retainer.

Referring now to Figure 10, it will be observed that the head 15 bears down upon the upper end of the body 21 and the block like extension 16 extends into the pocket, so that the lugs 18 are arranged in the slots 23. Retaining screws 31 are then brought into play to separably fasten the shank and coupling together.

Figure 5:
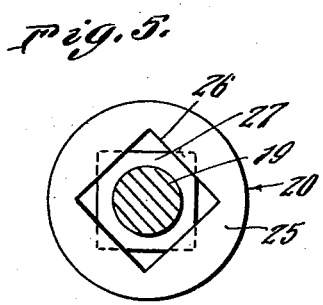
Figure 5 is a bottom plan view of Figure 3.

In operation, the head of the extension bit is aligned with the entrance opening 26, as shown in Figures 4 and 6, and then is forced inwardly through the coupling, until it comes into engagement with the abutment 17. In so doing, the retainer 28 is pushed back or up against the tension of the spring. Then the extension bit 19 is given a quarter turn, so that it moves from the position shown in Figure 6, to the position shown in Figure 5. In so turning the bit, the retainer is released and moves downwardly by the action of the spring and grips the head 27 as shown in Figure 3. To release the extension bit, the tongues 29 are engaged and the retainer is slid back against the tension of the spring with one hand while the bit is turned with the other to pull it out through the opening 26 in an obvious manner.

It is believed that by considering the description in connection with the drawing, the operation and advantages of this arrangement will be quite clear. Therefore a more lengthy description is regarded unnecessary. Minor changes in the shape, size and rearrangement coming within the field of invention claimed may be resorted to, if desired.

I claim:

In a tool of the class described, the combination with a shank provided at its free end with a coupling connected head equipped with a block like projection and a centralized abutment, together with outstanding retaining lugs, of an extension bit coupling comprising a cylindrical body open at its opposite ends, said body being provided with a socket receiving said block like extension and diametrically opposite slots receiving said lugs, a retaining slide in said sockets provided with tongues extending into said slots, said slide being provided with an apertured central portion adapted to receive the head of a bit, and a spring anchored to said centralized abutment at one end and bearing against the retaining slide at its other end, said spring being adapted for convolution about the head of the bit.

In testimony whereof I affix my signature.

CHARLES W. SMITH.